Nov. 26, 1940. C. PEARSON Re. 21,636

TRACTOR MOWER

Original Filed Dec. 2, 1931 4 Sheets-Sheet 1

Inventor
Charles Pearson
By Paul O. Pippel
Att'y.

Nov. 26, 1940. C. PEARSON Re. 21,636

TRACTOR MOWER

Original Filed Dec. 2, 1931 4 Sheets-Sheet 2

Inventor
Charles Pearson
By Paul O. Pipp
Att'y.

Nov. 26, 1940 C. PEARSON Re. 21,636
TRACTOR MOWER
Original Filed Dec. 2, 1931 4 Sheets-Sheet 3
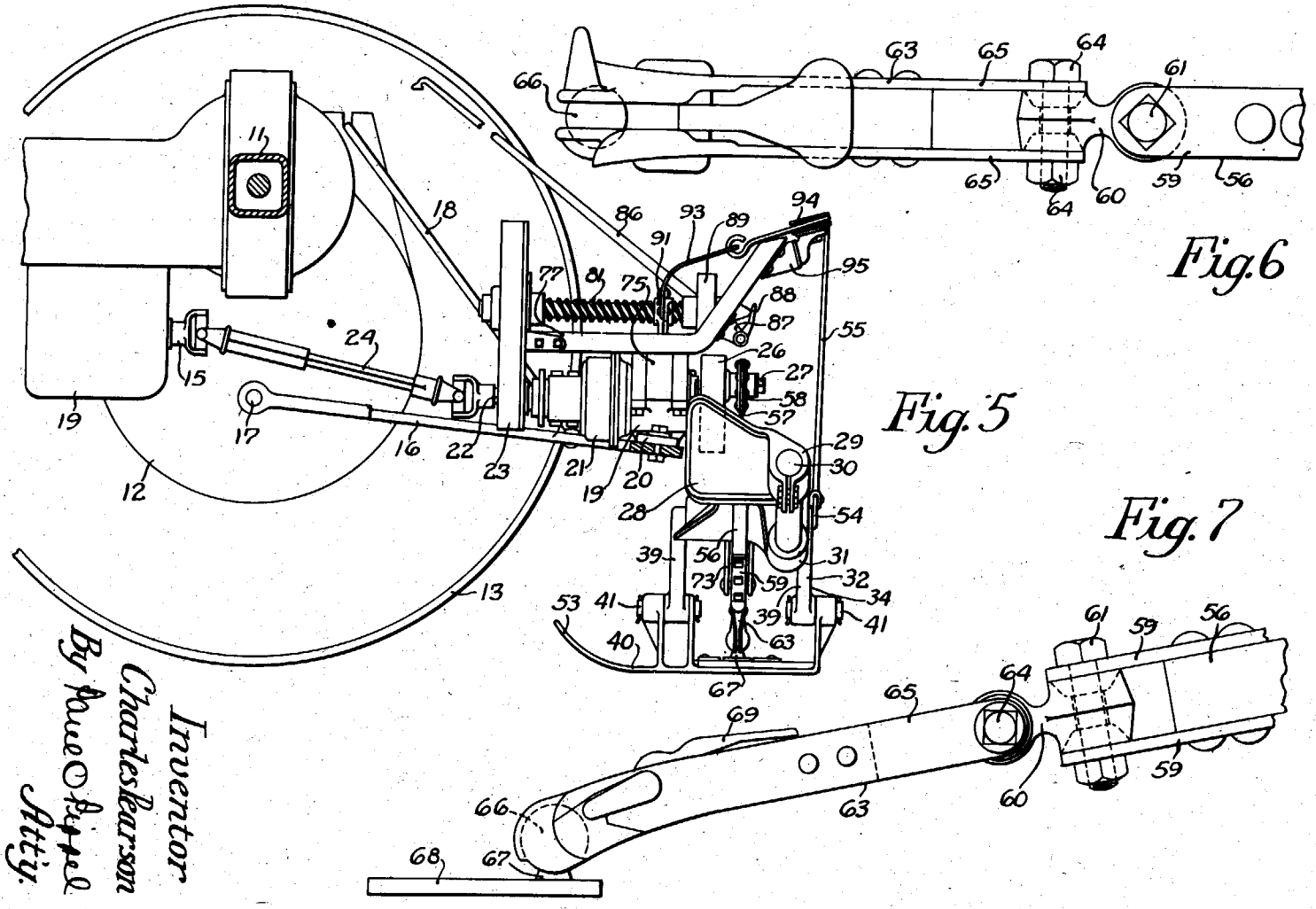
Inventor
Charles Pearson
By Paul O. Pippel
Atty.

TRACTOR MOWER

Original Filed Dec. 2, 1931 4 Sheets-Sheet 4

Inventor
Charles Pearson
By Paul O. Pippel
Atty.

Reissued Nov. 26, 1940

Re. 21,636

UNITED STATES PATENT OFFICE 21,636

TRACTOR MOWER

Charles Pearson, Waverly, Fla., assignor to International Harvester Company, a corporation of New Jersey Original No. 1,911,387, dated May 30, 1933, Serial No. 578,421, December 2, 1931. Application for reissue April 12, 1940, Serial No. 329,359

29 Claims. (Cl. 56—25)

This invention relates generally to mowing machines, and more particularly to a tractor mounted mower.

At the present time the trend in farming operations is to utilize tractors extensively for draft purposes as well as for power operation of attached implements. In the operation of tractor mowers having laterally extending cutter bars it is necessary to provide a number of adjustments and safety features. The relatively fast movement of a tractor mower is highly desirable but this advantage has been minimized due to the difficulty encountered because of obstructions which strike the laterally extending mower bar and cause damage before the tractor can be stopped. To overcome this difficulty various means have been devised to unlatch the cutter bar and permit it to swing around behind the tractor. Other devices for a similar purpose have been devised to throw out the tractor clutch or to stop its operation by other means. In addition to providing for the safety feature above described, it is necessary to provide a number of adjustments on the cutter bar. Said bar must be tiltable or rockable to ride over small obstructions or must be hinged to swing in a vertical plane to avoid obstructions too large for the tilting mechanisms and to lift the bar for transporting purposes.

The primary object of the present invention is to provide a mower attachment for a tractor having improved cutter bar releasing means.

Another principal object is to provide means for lifting a cutter bar, particularly of a construction embodying the first named object.

Another object is to provide a mower attachment of the kind specified, in which the mower is driven from a tractor power take-off shaft and in which the driving linkage is so constructed that it need not be disengaged when the mower bar is in lifted or unlatched position.

Still another object is to provide a simple and efficient mower attachment embodying the above objects, which may easily and quickly be attached to and detached from a tractor.

Other objects will be apparent to those skilled in the art, from the detailed description to follow.

Briefly, the objects of the invention are accomplished by the provision of a mower which has a frame pivoted to the rear of a tractor on a longitudinal axis, a cutter bar support pivoted to the frame on a substantially vertical axis, and a cutter bar pivoted to the support on a substantially longitudinal axis. Power actuated lifting means are provided for lifting the cutter bar and for lifting the frame. The pitman drive is of such a nature that it may continue to operate without damage to the sickle when the cutter bar is in lifted or trailing position.

In the drawings:

Figure 5 is a side elevation with the tractor axle housing in section, showing the same mower construction as in Figures 1 and 2;

Figure 6 is an enlarged plan view of a portion of the pitman linkage;

Figure 7 is an enlarged elevation of the same linkage shown in Figure 6; and,

Figure 1:
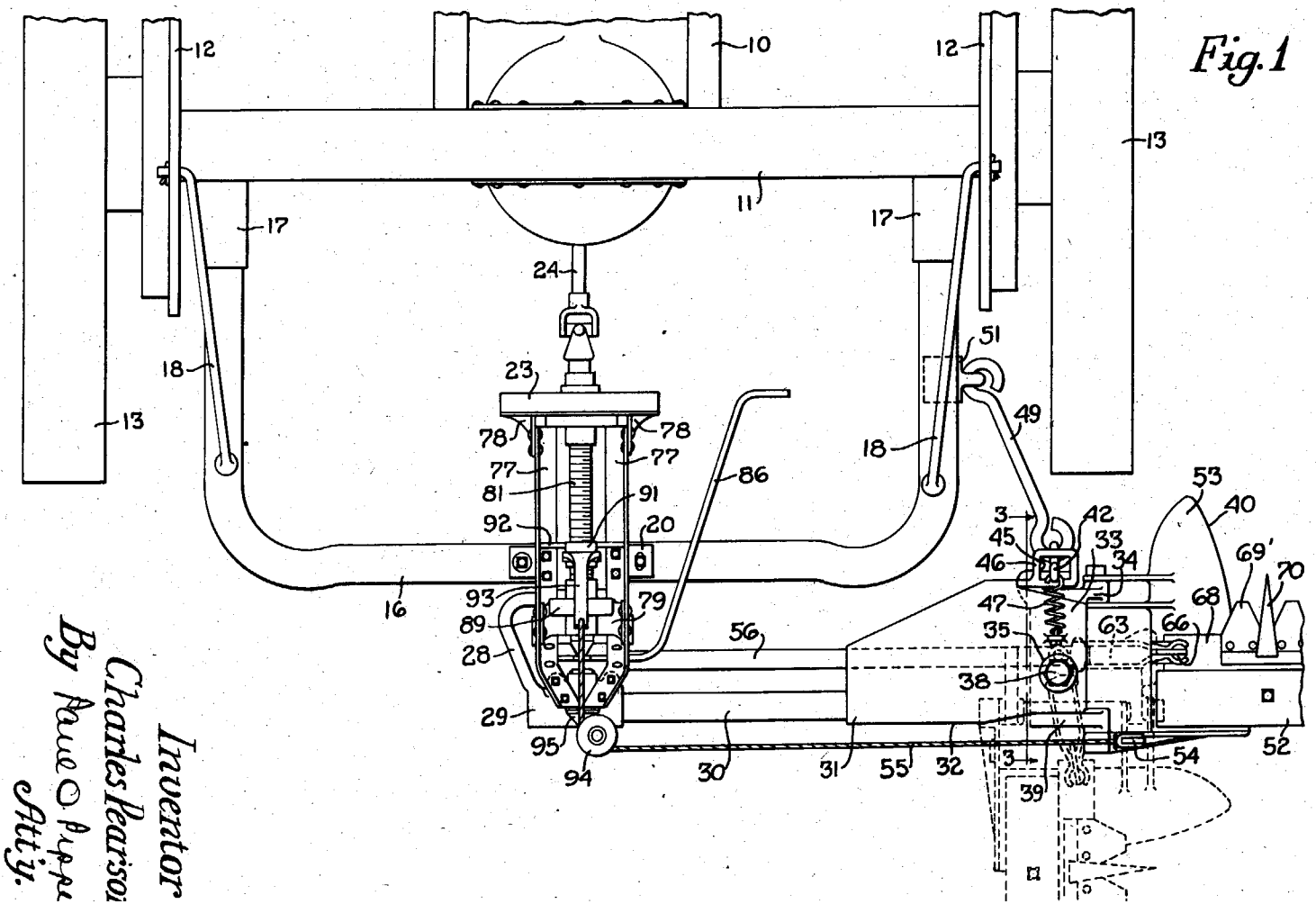
Figure 1 is a plan view showing the rear end of a tractor on which a mower embodying the invention is mounted. Said figure also shows, in dotted lines, the trailing position of the cutter bar.

The illustrative embodiment of the mower of this invention has been shown in connection with a tractor having side frame members 10, a rear axle housing 11, depending housings 12 at the ends of the housing 11, and drive wheels 13. A downwardly depending housing 14, forwardly of the housing 11, contains the gearing for driving the power take-off shaft 15. A rearwardly extending U-shaped draw-bar 16 is pivotally attached to the inside portions of the housings 12 on trunnions 17. Said draw-bar is held rigidly in position in a slightly downwardly extending position by brace rods 18 connected to the longitudinal portions of the draw-bar and to the top portions of the housings 12. The draw-bar held rigidly in position, forms a support for carrying the supporting structure for the mower frame. Said structure is not shown in detail, only to the extent as is necessary to show supporting means for the driving mechanism and the lifting mechanism. A casting 19 is rigidly secured to the draw-bar by means of lateral extensions 20 bolted to the draw-bar. Associated with said casting and rotatable with respect thereto about a longitudinal axis is a casing 21 containing driving gears for the pitman. A shaft 22 extending through the casing 21 and through a casing 23, to be hereinafter described, is connected by a splined intermediate shaft 24 and universal joints to the power take-off shaft 15. Through the gearing contained in the casing 21, the shaft 22 drives a shaft 25 at proper speed. A fly wheel 26, mounted on the shaft 25, carries a crank 27 for driving the mower cutting mechanism to be presently described.

The casing 21 is integrally connected to a bearing member which rotatably extends through a bearing formed on the upper side of the casing 19, and is provided with a rearward extension 28 which forms a part of the mower frame. Said extension is provided with an integral laterally extending sleeve portion 29 to which the main frame member 30 is rigidly secured. Said frame member is circular in cross section and at its lower end is rigidly secured to a sleeve portion 31 of the member 32, forming a lower portion of the mower frame. The frame member 32 has an upward and lateral extension 33 of a substantial width in the fore and aft direction.

Figures 2, 3, 4:
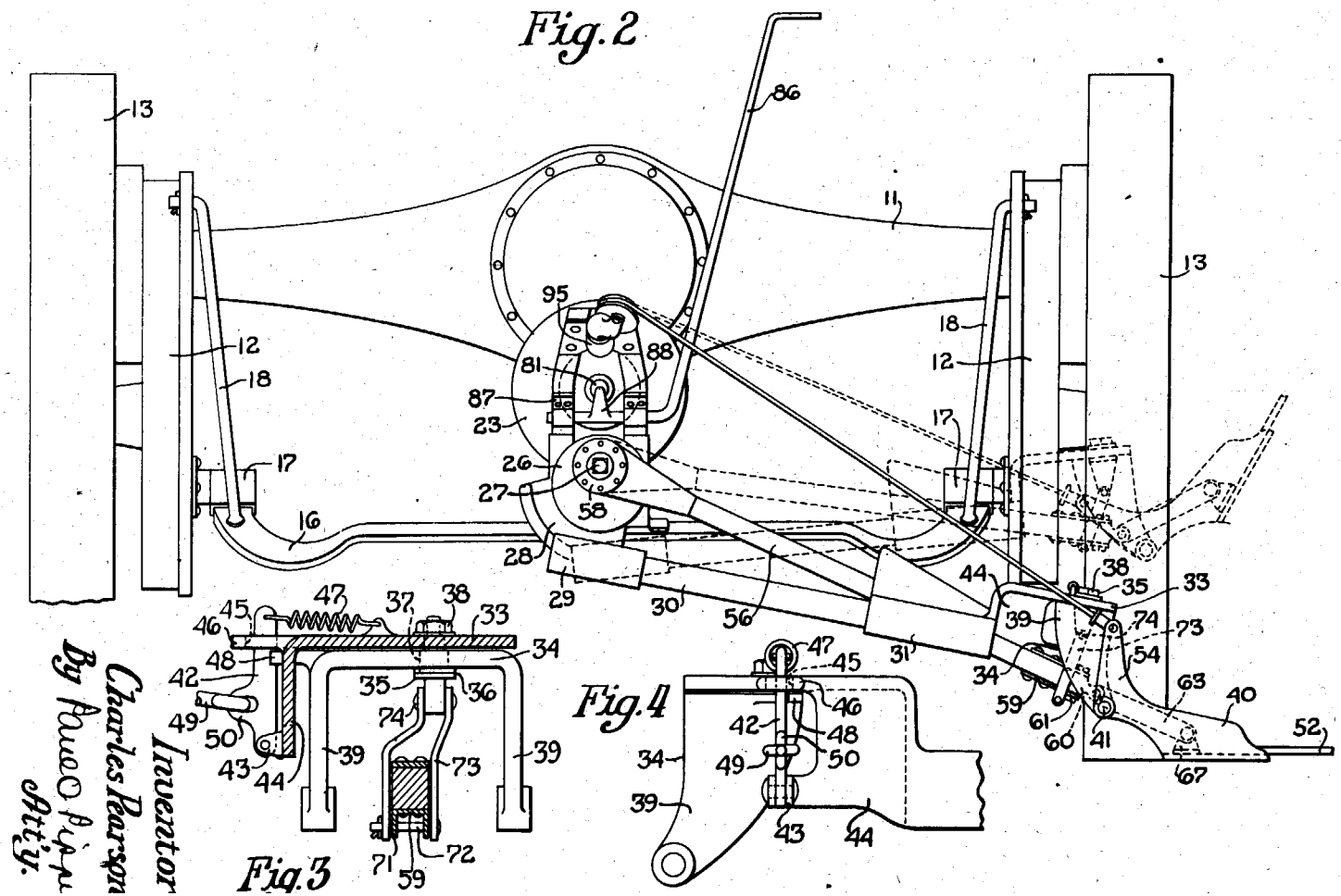
Figure 2 is a rear elevation, showing the same construction as Figure 1. This figure shows, in dotted lines, the lifted position of the mower frame and cutter bar.
Figure 3 is an enlarged sectional view, taken on the line 3—3 of Figure 1, showing certain elements of the latch mechanism and the pitman linkage.
Figure 4 is an enlarged side elevation, showing the latch mechanism of Figure 3.

As best shown in Figure 3, the mower bar support 34 is pivotally connected to the horizontal portion 33 of the frame member 32 by a vertically extending pivot pin 35. Said pin has a shoulder 36 and a cylindrical body portion 37 which is securely held against the lower surface of the extension 33 by a nut 38 threaded on an upward extension of the pin. By this construction clearance is provided for free movement of the support 34 with respect to the extension 33 of the frame member. The support 34 is provided with a pair of spaced, downwardly extending arms 39 which are provided with alined openings at their lower ends to form a pivot axis for the cutter bar head 40. Said cutter bar head is pivotally connected to the support by pins 41.

The frame member 32 and the cutter bar support 34 carry the cooperating elements of a latch means. A latch bar 42 is pivoted on a transverse axis to ears 43 projecting forwardly from a downward extension 44, formed at the forward side of the extension 33 of the frame member 32. Said latch bar extends upwardly through a slot 45, formed in a laterally extending lug 46, formed as an integral part of the frame member 32. A spring 47, connected to the top of the latch bar 42 and to an ear on the extension 33, acts to hold the latch bar against the extension 44. The cutter bar support 34 is provided with a forward extension 48, which projects forwardly. The extension 44 is cut away laterally from the side to provide for free movement of the extension 48. A notch is formed on the forward face of the extension 48 in which the latch lever 42 fits. A link 49 is pivotally connected to an ear 50 on the latch bar adjacent its lower end and to a bracket 51 connected to one side of the draw-bar.

A cutter bar 52 of a conventional construction is secured to the cutter bar head 40. Said cutter bar head is also provided with an upwardly directed shoe 53 for slidably engaging the ground and overcoming small obstructions. On the rear side the cutter bar head 40 is provided with an integral upwardly extending lifting arm 54, to which a rope or cable 55 is attached by a suitable clevis.

The driving means for the cutting mechanism includes a drive member or first pitman 56, which may be of a conventional construction, having a flat flexible member 57 secured to the upper end. Said member is riveted between two hubs 58, which are formed with bearings for mounting on the crank 27. At its lower end the pitman is provided with a force-transmitting element or portion pivotally connected by two flat bearings 59 secured, respectively, above and beneath the pitman to a connecting member 60 on an axis extending generally in a vertical direction, being, however, perpendicular to the pitman 56. A bolt 61 extends through the bars 59 and the connecting member 60 to form the pivot. The member 60 is pivotally connected on an axis at right angles to the axis formed by the bolt 61 to a sickle driving member in the form of a second pitman or link 63. Said connection is formed by a bolt 64 extending through the member 60 and through two spaced bars 65, forming a part of the member 63. The bars 65 are formed at their ends opposite the connection above described, with spherical depressions to form a socket joint with a ball 66 integrally formed on a bracket 67, which constitutes the connecting means with the sickle 68. A releasable securing means, designated generally as by the numeral 69, is provided for holding the socket portions of the bars 65 in engagement with the bolt 66. The sickle 68 is provided with knives 69 of the conventional construction. Mower guards 70, secured to the cutter bar 52, cooperate with the knives 69', as in the conventional mower.

The lower bar 59 is provided with ears 71 having alined openings for the insertion of a pivot pin 72. Said pin also extends through openings formed in upwardly extending links 73. Said links are pivotally connected by a pin 74 to a downwardly extending head formed on the pivot pin 35.

Figure 8:
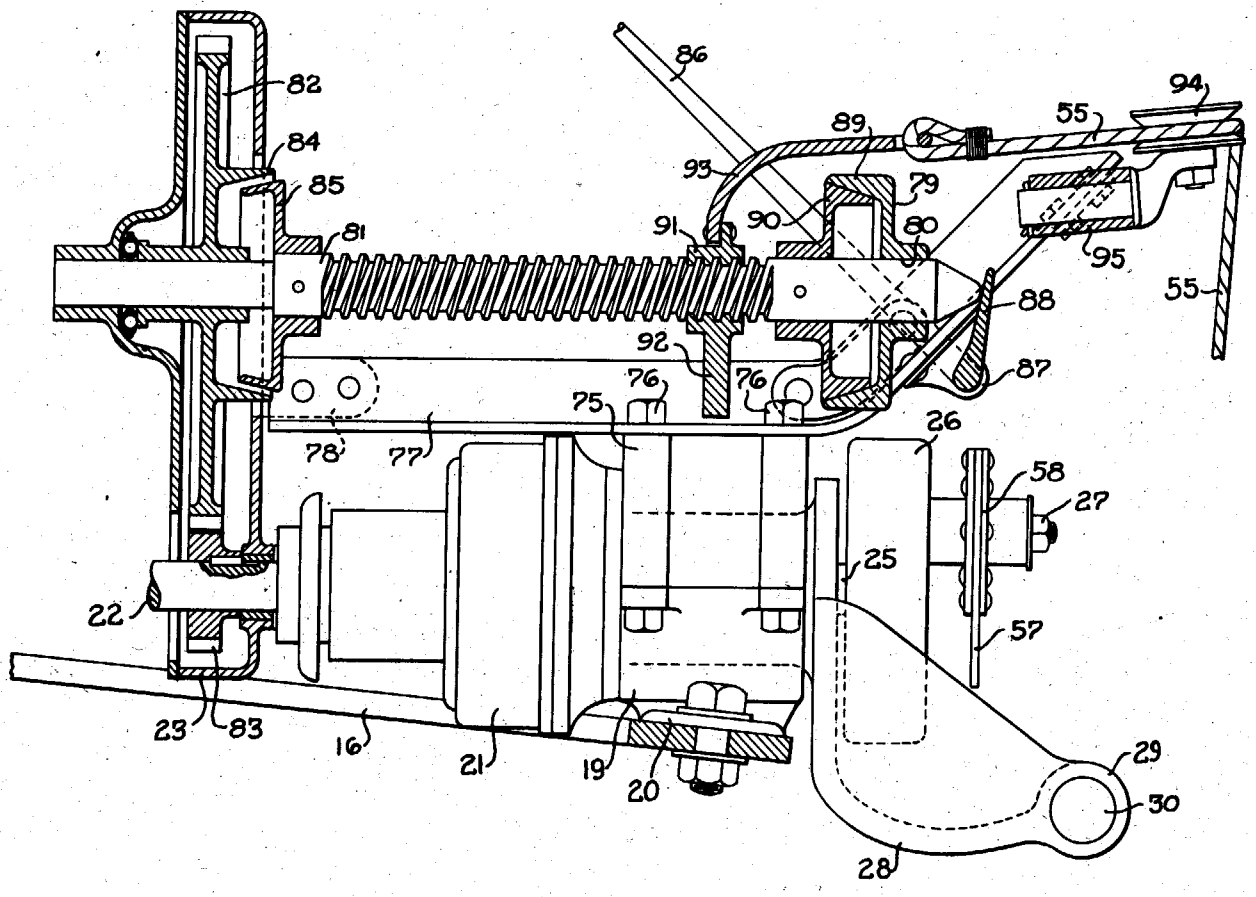
Figure 8 is an enlarged view, showing the mower driving means partly in section and the lifting means in section.

As previously described, the casting 19 forms a bearing for the casing 21 and the parts rigidly associated therewith. As casting 75 forms the upper half of the bearing for the same parts. The casting 75 is secured by bolts 76 to the casting 19. Said bolts also rigidly secure in position two spaced parallel longitudinally extending angle bars 77. Said bars provide means for mounting the lifting mechanism. The casing 23, previously referred to is rigidly secured to the forward ends of the angle bars 77 by means of the bracket portions 78, which are riveted to the bars 77. At their rearward ends the bars 77 are bent upwardly, as best shown in Figure 8, and bent inwardly, as best shown in Figure 1. A casting 79 is secured to the bars 77 slightly rearwardly of the draw-bar, as shown in Figures 1, 5, and 8. Said casting is formed with a longitudinally extending bore 80 through which a shaft 81 rotatably extends. At its other end the shaft 80 rotatably extends into the casing 23. Within the casing 23 a gear 82 is rotatably mounted on the shaft 81. Said gear is in constant mesh with a gear 83, mounted on the shaft 22, previously described. Said gear carries integral therewith, a rearwardly extending annular flange 84, formed internally with a conical clutch face. A conical clutch member 85 is rigidly mounted on the shaft 81 in a position to be engaged with the clutch face formed on the flange 84. At its rear end the shaft 81 projects beyond the casting 79. A hand lever 86 pivoted on a transverse axis on a bracket 87 secured to the angle bars 77, has a bell crank extension 88 operable to engage the rear end of the shaft 81. The lever 86 extends to a position where it can be engaged by the tractor operator. The casting 79 is formed forwardly with an annular flange 89, which is formed internally with a conical clutch face. A clutch member 90, rigidly secured to the shaft 81, is formed with a conical clutch face engageable with the clutch face formed on the flange 89. Between the clutch members 85 and 90 the shaft 81 is formed with a worm thread. An internally threaded member 91 is mounted on the shaft. Said member has a downward extension 92 which slidably fits between the bars 77. Above the member 91 an upwardly and rearwardly curved member 93 is provided for connection with the rope or cable 55. A pulley 94 is swiveled in a bracket 95, secured to the upper ends of the bars 77. The cable 55 passes over said pulley and downwardly, as previously described.

In the operation of the device, as above described, power from the shaft 55, transmitted through the shafts 24 and 23, drives the crank 27 and the pitman carried thereby. As said pitman is reciprocated the links 73 form a guide for the lower end. The reciprocating movement is transmitted through the connecting member 60 and the driving member 63 to the sickle 68. The tractor is driven forwardly with the shoe 53 sliding along the ground and riding over the minor obstructions. The mower frame which consists essentially of the frame members 30, 32, and the associated parts at the upper end which carry therewith the casing 21, pivots about a longitudinal axis, thereby allowing the shoe 53 to float up and down along the irregularities of the ground. The link 49 holds the outer end of the frame against rearward displacement. However, when the cutter bar encounters an obstruction and exerts a force above the predetermined amount for which the latch means is adjusted, the tension on the link 49 overcomes the action of the spring 47 and pulls the latch member 42 out of engagement with the notch in the extension 48.

It is to be understood that the connecting point of the link 49 on the latch member 42 and the strength of the spring 47 determine the amount of pressure required on the cutter bar to actuate the latch and release the cutter bar support. As soon as the latch is released the cutter bar support 39 pivots around the vertical axis formed by the pin 35. The dotted lines in Figure 1 show the cutter bars in trailing position. Due to the particular construction of the linkage by which the pitman is connected to the cutter bar and suspended from the mower frame, it is not necessary in this construction to provide means for disengaging the pitman driving means. When the cutter bar swings around rearwardly, the connecting member 60 pivots about the bolt 61. As the drive member 56 continues to operate, guided by the links 73, the end of the member or links 63 connected to the member 60, moves laterally the same distance as in working position. However, as clearly illustrated by the dotted position shown in Figure 1, the sickle bar will move relatively small distances as the forward end of the member 60 moves laterally. There is no strain set up in the linkage during operation of the pitman with the cutter bar in controlling position.

The operation of the lifting means will be clear by inspecting the enlarged showing of Figure 8. When the clutch face of the member 90 is in engagement with the clutch face of the flange 89, the member 91, and therefore the cable connected thereto, is held in position. To exert a pull on said cable the lever 96 is depressed, thereby moving the shaft 81 rearwardly, disengaging the clutch face at the rear end and engaging the clutch face on the member 85 with the clutch face on the flange 84. As the gear 82 is continuously rotated the shaft is rotated when the engagement described takes place. The worm on the shaft 81 is so cut that upon positive driving by the gears 82 and 83 the member 81 is moved forwardly, thereby exerting a pull on the cable 55. When tension is first applied to the cable the cutter bar is raised to a tilted position. Upon further movement the entire mower frame is lifted, as shown in dotted lines in Figure 2. Inspection of the linkage which connects the pitman with the sickle bar, as shown in the dotted position in Figure 2, will make clear that the continued operation of the pitman when the cutter bar is lifted, does not set up any undue strains. The drive member 56, guided at its lower end by the links 73, continues to move the lower end of the sickle driving member or pitman 63, which, in the lifted position, has pivoted about the bolt 64. The sickle continues to be reciprocated through, however, a much shorter path.

When the cutter bar and the mower frame have been lifted to the desired extent, the operator merely removes pressure from the lever 86. The shaft 81 immediately slides rearwardly and engages the clutch faces on the clutch member 90 and the annular flange 89. As said flange is stationary, its engagement is in effect a brake. When the mower frame and cutter bar are in lifted position and the operator desires to lower them in operative position, he merely exerts sufficient pressure on the lever 86 to disengage the clutch faces at the rear of the shaft 81 without engaging the clutch faces at the forward end of said shaft. The worm 81 is cut with sufficient pitch so that it is reversible to the extent that the weight of the mower frame and the cutter bar acting on the cable 55, is sufficient to rotate the shaft 81 in a reverse direction to that previously described, whereby the member 91 moves rearwardly. As soon as the mower frame has been lowered to the desired extent, the operator removes pressure from the lever 86.

It is to be understood that applicant has shown and described only certain preferred embodiments of his improved cutter bar release and lifting means and that he claims as his invention all modifications falling within the scope of the appended claims.

What is claimed is:

1. A tractor mounted and operated mower comprising, in combination with a tractor having a power take-off connection, a supporting structure attached thereto, a supporting member pivoted to said structure on a substantially vertical axis, a pressure releasable latch for holding said member against angular movement with respect to said structure, a cutter bar connected to said member, a sickle carried by the cutter bar, and drive connections between said sickle and the power take-off connection, said connections being flexible and including means operable to transmit power to the sickle in various angular positions whereby the operation of the sickle bar may continue with the cutter bar in rearwardly extending position when the latch means is released.

2. A tractor mounted and operated mower comprising, in combination with a tractor having a power take-off connection, a supporting structure attached thereto, said structure including a supporting member for a cutter bar, a cutter bar pivotally connected to said member on a longitudinal axis, means for lifting said bar upwardly about its attaching axis, a sickle carried by the cutter bar, and drive connections between said sickle and the power take-off connection, said connections being flexible and including means operable to transmit power to the sickle in various angular positions whereby the operation of the sickle may continue with the cutter bar in lifted position.

3. A tractor mounted and operated mower comprising, in combination with a tractor having a power take-off connection, a supporting structure attached thereto, a supporting member pivoted to said structure on a substantially vertical axis, a pressure releasable latch for holding said member against angular movement with respect to said structure, a cutter bar pivoted to said member on a longitudinal axis, means for lifting said bar upwardly about its attaching axis, a sickle carried by the cutter bar, and drive connections between said sickle and the power take-off connection, said connections being flexible and including means operable to transmit power to the sickle in various angular positions whereby operation of the sickle may continue with the cutter bar in lifted position and in rearwardly extending position when the latch means is released.

4. A tractor mounted and operated mower comprising, in combination with a tractor having a power take-off connection, a supporting structure pivotally attached to the tractor on a longitudinal axis, said structure including a supporting member for a cutter bar, a cutter bar pivotally connected to said member on a longitudinal axis, means for lifting said bar upwardly about its attaching axis, said means acting also to lift the supporting structure vertically about its axis, a sickle carried by the cutter bar, and drive connections between said sickle and the power take-off connection, said connections being flexible and including means operable to transmit power to the sickle in various angular positions whereby the operation of the sickle may continue with the cutter bar in lifted position.

5. A tractor mounted and operated mower comprising, in combination with a tractor having a power take-off connection, a supporting structure pivotally attached thereto on a longitudinal axis, a drive shaft extending from the tractor on said axis, a supporting member pivoted to the supporting structure on a substantially vertical axis, a pitman connected to said driving shaft at one end and floatingly supported at its other end by a linkage connected to the supporting structure, a cutter bar connected to the supporting member, a sickle carried by said cutter bar, a connecting link connected by universal joints to the sickle and to the floating end of the pitman, and a pressure releasable latch means for holding the supporting member against angular movement with respect to the supporting structure, pressure on the cutter bar being operative to release said latch and permit the cutter bar to swing rearwardly, the flexible connections between the pitman and the cutter bar permitting continued operation of the pitman with the cutter bar in rearwardly extending positions.

6. A tractor mounted and operated mower comprising, in combination with a tractor having a power take-off connection, a supporting structure pivotally attached thereto on a longitudinal axis, a drive shaft extending from the tractor on said axis, a supporting member pivoted to the supporting structure on a substantially vertical axis, a pitman connected to said driving shaft at one end and floatingly supported at its other end by a linkage connected to the supporting structure, a cutter bar pivoted to said member on a longitudinal axis, means for lifting said bar upwardly about its attaching axis, a sickle carried by said cutter bar, a connecting link connected by universal joints to the sickle and to the floating end of the pitman, and a pressure releasable latch means for holding the supporting member against angular movement with respect to the supporting structure, pressure on the cutter bar being operative to release said latch and permit the cutter bar to swing rearwardly, the flexible connections between the pitman and the cutter bar permitting continued operation of the pitman with the cutter bar in rearwardly extending positions and with the cutter bar in lifted positions.

7. A tractor mounted and operated mower comprising, in combination with a tractor having a power take-off shaft, a supporting structure mounted on the tractor, a drive shaft carried by said structure and operatively connected to the power take-off shaft, a crank on said shaft, a frame connected to the supporting structure and extending laterally therefrom, a mower bar support pivoted to said frame on a substantially vertical axis, a latch means locking the bar support to the frame, means connecting said latch to the supporting structure operative to release the bar support when a predetermined torque has been applied to the bar support, a mower bar pivoted to the support on a longitudinal axis, a sickle carried by said bar, a pitman secured to the crank on the drive shaft, a link pivotally connected to the lower end of the pitman and to the frame on longitudinal axes, and a link connected by universal joints to the end of the pitman and to the sickle.

8. A tractor mounted and operated mower comprising, in combination with a tractor having a fixed rearwardly extending draw bar and a rearward extending power take-off shaft, a supporting structure mounted on the drawbar, a drive shaft carried by said structure positioned in alinement with the power take-off shaft and operatively connected thereto, a crank on the rear end of said shaft, a frame pivoted to the supporting structure on a longitudinal axis and extending laterally therefrom, means connecting said frame to the drawbar to permit swinging of the frame, a mower bar support pivoted to said frame on a substantially vertical axis, a latch means locking the bar support to the frame, means connecting said latch to the connecting means operative to release the bar support when a predetermined torque has been applied thereto, a mower bar pivoted to the support on a longitudinal axis, a sickle carried by said bar, a pitman secured to the crank on the drive shaft, a link pivotally connected to the lower end of the pitman and to the frame on longitudinal axes, a link connected by universal joints to the end of the pitman and to the sickle, and lifting means connected to the cutter bar and to the supporting structure.

9. A device as set forth in claim 8, in which the lifting means consists of a threaded member rotatably mounted on the supporting structure, an internally threaded member mounted against rotation on said member whereby rotation thereof moves the internally threaded member longitudinally, a cable connected to said member and to the cutter bar, a clutch member mounted on the threaded member, a second clutch member mounted on the supporting structure, means to engage said members, and means to continually drive the second clutch member from the power take-off shaft.

10. A device as set forth in claim 8, in which the lifting means includes a cable connected to the cutter bar at a point eccentric with respect to its pivot axis on the bar support whereby the cutter bar is first raised to a lifted position by operation of the lifting means.

11. A mower comprising a supporting structure, driving means mounted on said structure, a supporting member pivoted to said structure on a substantially vertical axis, a pressure releasable latch for holding said member against angular movement with respect to said structure, a cutter bar connected to said member, a sickle carried by the cutter bar, driving means mounted on the supporting structure, and drive connections between said sickle and the driving means on the supporting structure, said connections being flexible and including means operable to transmit power to the sickle in various angular positions whereby the operation of the sickle bar may continue with the cutter bar in rearwardly extending position when the latch means is released.

12. A mower comprising a supporting structure, driving means mounted thereon, a supporting member pivoted to said structure on a substantially vertical axis, a pressure releasable latch for holding said member against angular movement with respect to said structure, a cutter bar pivoted to said member on a longitudinal axis, means for lifting said bar upwardly about its attaching axis, a sickle carried by the cutter bar, and drive connections between said sickle and the driving means on the supporting structure, said connections being flexible and including means operable to transmit power to the sickle in various angular positions whereby operation of the sickle may continue with the cutter bar in lifted position and in rearwardly extending position when the latch means is released.

13. A mower comprising a wheel supported frame, driving means mounted on said frame, a mower supporting structure pivotally attached to the frame on a longitudinal axis, said structure including a supporting member for a cutter bar, a cutter bar pivotally connected to said member on a longitudinal axis, means for lifting said bar upwardly about its attaching axis, said means acting also to lift the supporting structure vertically about its axis, a sickle carried by the cutter bar, and drive connections between said sickle and the driving means on the frame, said connections being flexible and including means operable to transmit power to the sickle in various angular positions whereby the operation of the sickle may continue with the cutter bar in lifted position.

14. A mower comprising a wheeled supporting frame, a mower supporting structure pivotally attached thereto on a longitudinal axis, a drive shaft extending from the frame on said axis, a supporting member pivoted to the supporting structure on a substantially vertical axis, a pitman connected to said driving shaft at one end and floatingly supported at its other end by a linkage connected to the supporting structure, a cutter bar connected to the supporting member, a sickle carried by said cutter bar, a link connected by universal joints to the sickle and to the floating end of the pitman, and a pressure releasable latch means for holding the supporting member against angular movement with respect to the supporting structure, pressure on the cutter bar being operative to release said latch and permit the cutter bar to swing rearwardly, the flexible connections between the pitman and the cutter bar permitting continued operation of the pitman with the cutter bar in rearwardly extending positions.

15. A tractor mounted and operated mower comprising, in combination with a tractor having a rearwardly extending drawbar, a supporting structure pivotally mounted on said drawbar on a longitudinal axis, a cutter bar mounted on said structure on a longitudinal axis, and a power operated lifting means mounted on the drawbar and actuated by a connection with the tractor drive mechanism, said lifting means being connected to the mower bar and being operative to lift both the mower bar and the supporting structure vertically away from the ground level.

16. A tractor mounted and operated mower comprising, in combination with a tractor having a power take-off shaft, a supporting structure mounted on the tractor, a drive shaft carried by said structure and operatively connected to the power take-off shaft, a crank on said shaft, a frame connected to the supporting structure and extending laterally therefrom, a mower bar support mounted on said frame, a mower bar pivoted to the support on a longitudinal axis, a sickle carried by said bar, a pitman secured to the crank on the drive shaft, a link pivotally connected to the lower end of the pitman and to the frame on longitudinal axes whereby that end of the pitman is floatingly mounted, and a link connected by joints having longitudinal pivot axes to the end of the pitman and to the sickle.

17. A tractor mounted and operated mower comprising, in combination with a tractor having spaced rear driving wheels, a supporting structure mounted on the tractor and extending rearwardly therefrom and laterally to one side behind one of the driving wheels, a mower bar pivoted on said structure behind and in substantially longitudinal alinement with said wheel on a substantially vertical axis, and a pressure operated latch means operable to hold said bar in laterally extended position and to release it upon a predetermined pressure to swing rearwardly in trailing position behind and in substantially longitudinal alinement with the driving wheel.

18. A tractor mounted and operated mower comprising, in combination with a tractor having spaced rear driving wheels, a supporting structure mounted on the tractor and extending rearwardly therefrom and laterally to one side behind one of the tractor drive wheels, a mower bar pivoted to said structure behind said wheel on a substantially vertical axis, a pressure operated latch means for holding said mower bar in laterally extended position and releasing it upon a predetermined pressure to swing rearwardly in trailing relation behind the driving wheel, a sickle mounted on the mower bar, and flexible driving connection between said sickle and the tractor drive mechanism, said drive connections including means operable to continue the operation of the sickle with the cutter bar in trailing position.

19. A tractor mounted and operated mower comprising, in combination with a tractor having spaced rear driving wheels, a supporting structure mounted on the tractor and extending rearwardly therefrom and laterally to one side behind one of the tractor drive wheels, a mower bar pivoted to said structure behind said wheel on a substantially vertical axis, a pressure operated latch means for holding said mower bar in laterally extended position and releasing it upon a predetermined pressure to swing rearwardly in trailing relation behind the driving wheel, a sickle mounted on the cutter bar, and driving means operable by the tractor driving mechanism, said means including a pitman mounted on the frame structure, the lower end of which is floatingly suspended therefrom for maintaining it in a transverse plane, and a link connected to said pitman and to the sickle by universal joints whereby the mower bar may take any angular position with respect to the supporting structure during operation of the driving means.

20. A tractor mounted and operated mower comprising, in combination with a tractor having a power take-off shaft, a supporting structure carried by the tractor, a driving member rotatably carried by said structure and connected to the power take-off shaft for rotation about a horizontal axis disposed longitudinally of the tractor, a cutter bar carried by the supporting structure on a vertical pivot axis, said bar normally extending laterally of the tractor and having rearward swinging movement about said pivot axis with respect to the supporting structure and driving member, a releasable latch normally holding the bar in laterally extending position, a knife carried by the cutter bar for reciprocation, and a driving connection between the knife and the driving member, said connection including a pivot providing for angular movement between the connection and the driving member about a generally vertical axis disposed in proximity to the aforesaid pivot axis, whereby the operation of the driving member and connection may continue with the cutter bar swung rearwardly.

21. A tractor mounted and operated mower comprising, in combination with a tractor having a power take-off shaft, a supporting structure carried by the tractor, a horizontal, longitudinal driving shaft journaled on said structure and connected to the power take-off shaft, a cutter bar carried by the supporting structure on a vertical pivot axis and normally extending laterally of the tractor and having rearward swinging movement about said pivot axis with respect to the supporting structure and driving shaft, a releasable latch normally holding the bar in laterally extending position, a knife carried by the cutter bar for reciprocation, and a pitman connected between the knife and the driving shaft, the connection between the shaft and pitman including a pivot providing for angular movement between the pitman and the driving shaft about a generally vertical axis disposed in proximity to the aforesaid pivot axis, whereby the operation of the driving shaft and pitman may continue with the cutter bar swung rearwardly.

22. A mower comprising a supporting structure, driving means carried by said structure, a cutter bar carried by the supporting structure on a vertical pivot axis and normally extending laterally of the structure and driving means and having rearward swinging movement about said pivot axis with respect to the structure and driving means, a releasable latch normally holding the bar in laterally extending position, a knife carried by the cutter bar for reciprocation, and a driving connection between the knife and the driving means, said connection including a pivot providing for angular movement between the connection and the driving means about a generally vertical axis disposed in proximity to the aforesaid axis, whereby the operation of the driving means and connection may continue with the cutter bar swung rearwardly.

23. A tractor mounted and operated mower comprising, in combination with a tractor having a power take-off shaft, a frame carried by the tractor, a horizontal, longitudinal shaft journaled on said frame and connected to the power take-off shaft for rotation therewith, a shoe carried by the frame on a vertical pivot axis, a cutter bar carried by the shoe normally extending laterally of the tractor and having rearward swinging movement with the shoe about said pivot axis with respect to the frame shaft, a releasable latch normally holding the bar in laterally extending position, a knife carried by the cutter bar for reciprocation, and a pitman connected between the knife and the shaft, the connection between the shaft and pitman including a pivot providing for angular movement between the pitman and the shaft about a generally vertical axis disposed in proximity to the aforesaid pivot axis, whereby the operation of the shaft and pitman may continue with the shoe and cutter bar swung rearwardly.

24. A tractor mounted and operated mower comprising, in combination with a tractor having a power take-off shaft, a mower frame carried by the tractor, a driving means carried by the frame and driven by the power take-off shaft, a cutter bar carried by the frame on a vertical pivot axis, a releasable latch normally holding the bar in laterally extending position, a knife carried by the cutter bar for reciprocation, and a pitman connected pivotally at one end to the knife and connected at its other end to the driving means, the latter connection including pivot means providing for angular movement between the pitman and the driving means about a generally vertical axis disposed in proximity to the aforesaid pivot axis, whereby the operation of the driving means and pitman may continue with the cutter bar swung rearwardly.

25. A tractor mounted and operated mower comprising, in combination with a tractor having a power take-off shaft, a mower frame carried by the tractor and having a grassward portion disposed toward one side of the tractor, a driving means connected to the power take-off shaft and including a force-transmitting portion disposed in the vicinity of the grassward portion of the frame, a cutter bar carried by the grassward portion of the frame on a vertical pivot axis, said bar normally extending laterally grasswardly from the frame and driving means and having rearward swinging movement about said pivot axis with respect to the frame and driving means, a releasable latch normally holding the bar in laterally extending position, a knife carried by the cutter bar for reciprocation, and a pitman connected pivotally at one end to the knife and at its other end to the force-transmitting portion of the driving means, the latter connection including a pivot providing for angular movement between the pitman and the driving means about a generally vertical axis disposed in proximity to the aforesaid pivot axis, whereby the operation of the driving means and pitman may continue with the cutter bar swung rearwardly.

26. A tractor mounted and operated mower comprising, in combination with a tractor having a power take-off shaft, a support carried by the tractor, a cutter bar carried by the support normally extending laterally from the support and including a connection with the support on a vertical axis about which the cutter bar may have rearward swinging movement with respect to the support, a releasable latch normally holding the cutter in laterally extending position, a knife carried by the cutter bar, driving means carried by the support, and a pitman connected between the knife and said means and including a connection providing a pivot on a vertical axis, whereby the pitman may swing rearwardly with the cutter bar with respect to the driving means and support.

27. A tractor mounted and operated mower comprising, in combination with a tractor having power take-off means, supporting structure carried by the tractor, a cutter bar carried by the supporting structure on a vertical pivot axis, a releasable latch normally holding the cutter bar in laterally extending position, a knife carried by the bar for reciprocation thereon, drive means connected to the power take-off means and including a force-transmitting element having cyclic motion laterally of the tractor, and linkage connecting the force-transmitting element and the knife, said linkage including a joint on a vertical axis generally in the vicinity of the aforesaid axis, whereby, when the cutter bar and knife swing rearwardly with respect to the supporting structure and drive means, the drive means continues to operate.

28. A tractor mounted and operated mower comprising, in combination with a tractor having power take-off means, a supporting structure carried by the tractor and including cutting mechanism extending laterally of the tractor, said cutting mechanism including a sickle, a drive shaft carried by the supporting structure and connected to the power take-off means, a pitman connected at one end to the drive shaft and having its other end extending laterally toward the sickle, a link connected at one end to the sickle and at its other end to the other end of the pitman, and means pivotally connected to the supporting structure and to the pitman adjacent the connection between the pitman and the link.

29. A tractor mounted and operated mower comprising, in combination with a tractor having power take-off means, a supporting structure carried by the tractor and including cutting mechanism extending laterally of the tractor, said cutting mechanism including a sickle, a drive shaft carried by the supporting structure and connected to the power take-off means, a pitman connected at one end to the drive shaft and extending laterally toward the sickle, a link connected at one end to the sickle and at its other end to the other end of the pitman, and means carried by the supporting structure and supporting the pitman and link adjacent the connection between said pitman and link.

CHARLES PEARSON.